(12) United States Patent
Rodriguez

(10) Patent No.: US 7,451,072 B2
(45) Date of Patent: Nov. 11, 2008

(54) NETWORK SIMULATION SYSTEM AND METHOD

(75) Inventor: Joe A. Rodriguez, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1504 days.

(21) Appl. No.: 09/965,878

(22) Filed: Sep. 28, 2001

(65) Prior Publication Data

US 2002/0042706 A1 Apr. 11, 2002

Related U.S. Application Data

(60) Provisional application No. 60/236,572, filed on Sep. 29, 2000.

(51) Int. Cl.
*G06F 9/45* (2006.01)
*H04L 12/28* (2006.01)

(52) U.S. Cl. .................. 703/22; 703/27; 709/220; 709/231; 370/401; 370/467

(58) Field of Classification Search ............. 709/220, 709/227, 231, 230, 203, 226; 703/21, 22, 703/27; 370/395.21, 397, 401, 328, 54, 94.3, 370/392, 467, 466; 340/988, 825.02, 825.5
See application file for complete search history.

(56) References Cited

U.S. PATENT DOCUMENTS

| | | | |
|---|---|---|---|
| 4,347,498 A | 8/1982 | Lee et al. | 340/825.02 |
| 4,716,408 A | 12/1987 | O'Connor et al. | 340/825.5 |
| 5,161,153 A | 11/1992 | Westmore | 370/94.3 |
| 5,452,292 A | 9/1995 | Okanoue et al. | 370/54 |
| 5,544,161 A * | 8/1996 | Bigham et al. | 370/397 |
| 5,638,377 A | 6/1997 | Quinquis et al. | 370/392 |
| 5,677,905 A * | 10/1997 | Bigham et al. | 370/395.21 |
| 5,684,799 A * | 11/1997 | Bigham et al. | 370/397 |
| 5,850,345 A | 12/1998 | Son | 364/578 |
| 6,002,852 A * | 12/1999 | Birdwell et al. | 709/203 |
| 6,127,946 A * | 10/2000 | Tzidon et al. | 340/988 |
| 6,424,653 B1* | 7/2002 | Arsikere et al. | 370/401 |
| 6,640,248 B1* | 10/2003 | Jorgensen | 709/226 |
| 6,680,922 B1* | 1/2004 | Jorgensen | 370/328 |

OTHER PUBLICATIONS

Shah et al., P. Data Network Analysis Using NOVA, IEEE Int. Conference on Performance, Computing and Communications, Feb. 1998, pp. 124-130.☐☐.*

(Continued)

*Primary Examiner*—Russell Frejd
(74) *Attorney, Agent, or Firm*—Tarolli, Sundheim, Covell & Tummino LLP

(57) ABSTRACT

A method allows communication within a network. The method includes the steps of: transmitting data packet as a broadcast signal (107) from a first application node (105) of a first subnetwork (101) to a first gateway node (103) of the first subnetwork (101); transmitting the data packet as a point-to-point signal (108) from the first gateway node (103) to a second gateway node (104) of a second subnetwork (102); and transmitting the data packet as a broadcast signal (109) from the second gateway node (104) of the second subnetwork (102) to at least one application node (106) of the second subnetwork (102).

12 Claims, 6 Drawing Sheets

OTHER PUBLICATIONS

Sass, P. Communications Networks for the Force XXI Digitized Battlefield, ACM, Mobile Networks and Applications, Oct. 1999, pp. 139-155.☐☐.*

Schuba et al., C.L. Prototyping Experiences with Classical IP and ARP over Signaled ATM Connections, ScienceDirect, Journal of Systems and Software, vol. 44, Iss. 1, Dec. 1998, pp. 31-43.*

DeMartino, K. ISDN and the Internet, ScienceDirect, Computer Networks, vol. 31, Iss. 22, Nov. 1999, pp. 2325-2339.*

War Games at the War College on Personal Computers, Defense Electronics, Apr. 1984, pp. 1-2.*

Article entitled: *Long haul participation in a distributed interactive simul demonstration*—Woodyard, J.M.; Reif, D.C.—Avionics Directorate, Wright Lab., Wright-Patterson AFB, OH, USA—This paper appears in: Aerospace and Electronics Conference, 1995. NAECON 1995., Proceedings of the IEEE 1995 National, pp. 810-816 vol. 2, May 22-26, 1995.

* cited by examiner

NETWORK SIMULATION SYSTEM AND METHOD

RELATED APPLICATIONS

This application claims the benefit of U.S. Provisional Application Ser. No. 60/236,572, filed Sep. 29, 2000.

FIELD OF THE INVENTION

The present invention relates to a simulation network and, more particularly, to a composite broadcast system for simulating processes such as manufacturing processes, war games, or entertainment games.

BACKGROUND OF THE INVENTION

A necessity in a conventional simulation system is the ability to link, or network, various simulation environments together. Each environment is typically a simulation laboratory and is confined to its own subnetwork. Each of these subnetworks must be connected, or mirrored, in order to form one network. The subnetworks may be any combination of single ring, double ring, bus, star, or other suitable subnetworks.

A conventional simulation system utilizes computers that are in close proximity to each other and/or have dedicated hardwire connections to each other. Another conventional simulation system utilizes a combination of plural simulation devices having dedicated hardwire connections located throughout proximal locations. Eliminating these constraints by using the Internet or an undedicated intranet for the necessary connections, without losing the complete confidentiality and reliability required for many simulations, would allow human operators to take part in the simulations while being located at different remote locations throughout the United States and even other parts of the world.

Such simulations could then reliably and efficiently be conducted within the framework of client server database systems, instant notification/messaging applications, rudimentary data transfer, etc. Thus a system in accordance with the present invention may utilize existing communication networks for new and ever changing applications.

SUMMARY OF THE INVENTION

In accordance with the present invention, a method allows communication within a network. The method includes the steps of: transmitting a data packet as a broadcast signal from a first application node of a first subnetwork to a first gateway node of the first subnetwork; transmitting the data packet as a point-to-point signal from the first gateway node to a second gateway node of a second subnetwork; and transmitting the data packet as a broadcast signal from the second gateway node of the second subnetwork to at least one application node of the second subnetwork.

In accordance with another feature of the present invention, a system simulates a war game. The system includes a first device, a second device, and a third device. The first device transmits a data packet as a broadcast signal from a first application node of a first subnetwork to a first gateway node of the first subnetwork. The second device transmits the data packet as a point-to-point signal from the first gateway node to a second gateway node of a second subnetwork. The third device transmits the data packet as a broadcast signal from the second gateway node of the second subnetwork to at least one application node of the second subnetwork.

In accordance with still another feature of the present invention, an apparatus simulates a war game. The apparatus includes a first means, a second means, and a third means. The first means transmits a data packet as a broadcast signal from a first application node of a first subnetwork to a first gateway node of the first subnetwork. The second means transmits the data packet as a point-to-point signal from the first gateway node to a second gateway node of a second subnetwork. The third means transmits the data packet as a broadcast signal from the second gateway node of the second subnetwork to at least one application node of the second subnetwork.

In accordance with yet another feature of the present invention, a computer program product communicates within a network. The product includes a first subnetwork and a second subnetwork. The first subnetwork has a first application node and a first gateway node. The second subnetwork has a second application node and a second gateway node. The first application node transmits a data packet as a broadcast signal to the first gateway node of the first subnetwork. The first gateway node transmits the data packet as a point-to-point signal from the first gateway node to the second gateway node of the second subnetwork. The second gateway node transmits the data packet as a broadcast signal from the second gateway node of the second subnetwork to the second application node of the second subnetwork.

BRIEF DESCRIPTION OF THE DRAWINGS

The foregoing and other advantages of the invention will become more readily apparent from the following description of a preferred embodiment of the invention as taken in conjunction with the accompanying drawings, which are a part hereof, in which.

DESCRIPTION OF THE PREFERRED EMBODIMENTS

In accordance with the present invention, a networked communication system 10 allows simulation of various processes such as a war game with game participants and/or equipment at remote locations or a manufacturing system for various manufacturing processes. Such simulations could utilize existing communication networks within the framework of client server database systems, instant notification/messaging applications, rudimentary data transfer, etc.

Figure 1:
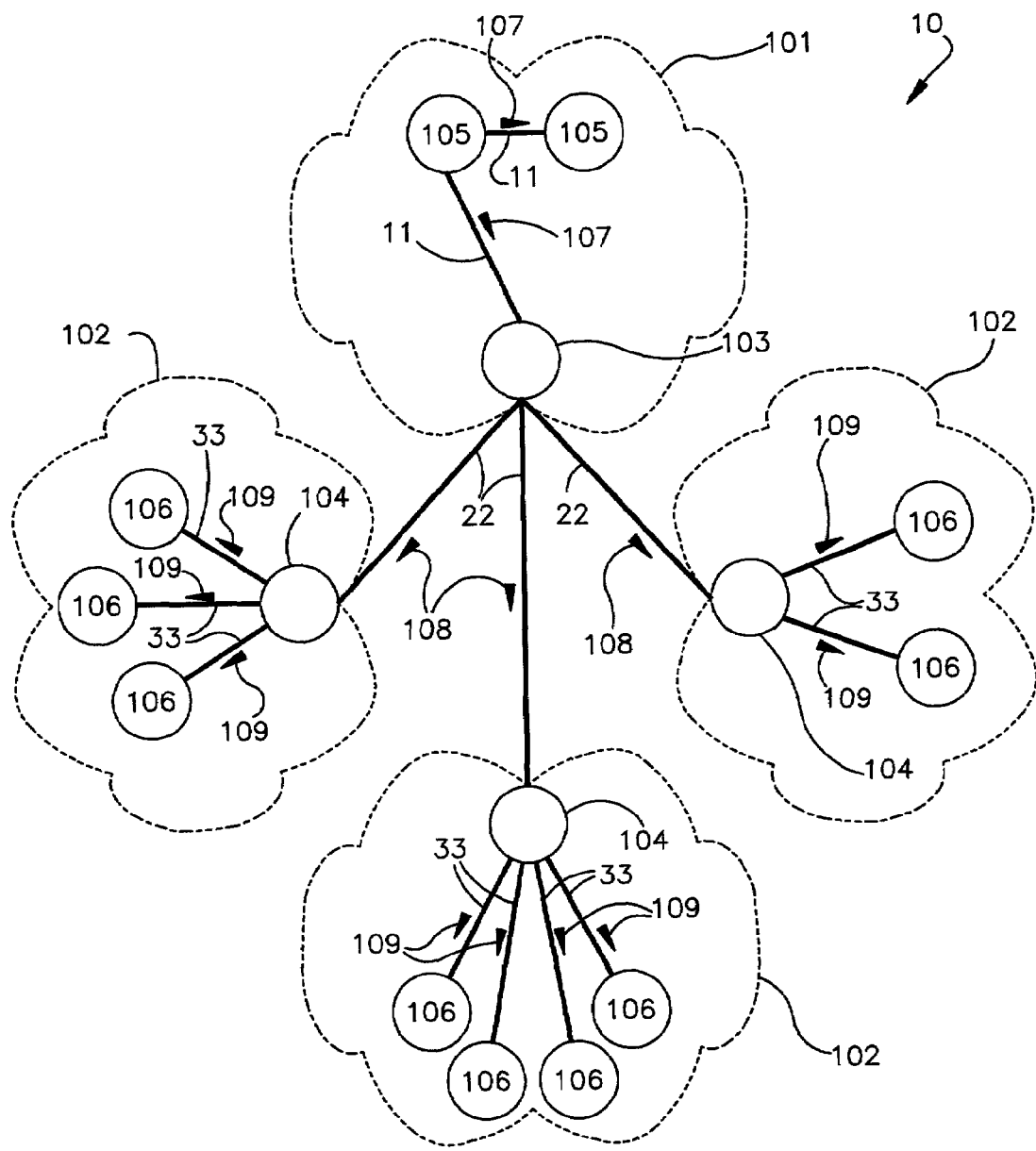
FIG. 1 is a schematic view of a system in accordance with the present invention.

As viewed in FIG. 1, the system 10 may comprise a first device 11, a second device 22, and a third device 33. The first device 11 transmits a data packet as a broadcast signal 107 (i.e., simultaneous sending of the data packet to all nodes) from a first application node 105 of a first subnetwork 101 to a second application node 105 of the first subnetwork and to a first gateway node 103 of the first subnetwork. The first device 11 is typically one or more computers that is/are part of a local area network (LAN) located at a first location. The first gateway node 103 may be a communication hub or a computer that is also part of the LAN at the first location.

The second device 22 transmits the data packet as a point-to-point signal 108 from the first gateway node 103 to one or more remote gateway nodes 104 of other remote subnetworks 102. The second device 22 may be the Internet or some other communication network that is not solely dedicated to this simulation. The remote gateway nodes 104 may be communication hubs or computers that are part of other remote LAN's at remote geographic locations.

The third devices 33 transmit the data packet as a broadcast signal 109 from the remote gateway nodes 104 of the remote subnetworks 102 to at least one application node 106 of each remote subnetwork. The third devices 33 are typically one or more computers that are part of the remote LAN's located at the remote locations other than the first location.

Figure 2:
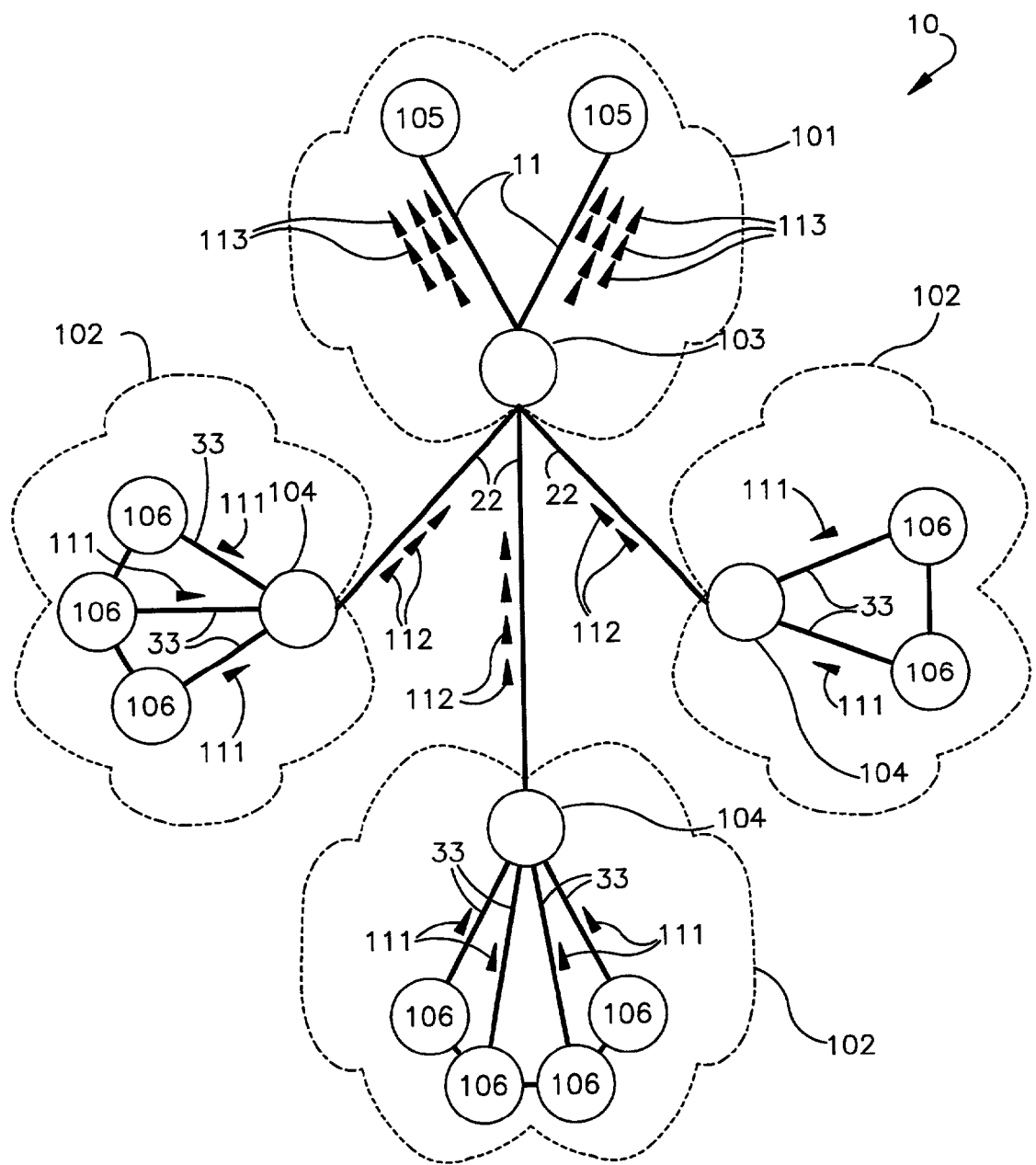
FIG. 2 is a schematic view of the system of FIG. 1 under a different condition.

As viewed in FIG. 2, the third devices 33 may transmit other data packets as broadcast signals 111 from the application nodes 106 of the remote subnetworks 102 to the application nodes 106 and the remote gateway nodes 104 of the remote subnetworks. The second device 22 transmits these other data packets as point-to-point signals 112 from the remote gateway nodes 104 to the first gateway node 103 of the first subnetwork 101. The first device 11 transmits the data packets as broadcast signals 113 from the first gateway node 103 of the first subnetwork 101 to the application nodes 105 of the first subnetwork.

The system 10 may utilize a User Datagram Protocol (UDP)/Internet Protocol (IP). This UDP/IP is a connectionless protocol that runs "on top of" IP networks. UDP/IP provides very few error recovery services, offering instead a direct way to send and receive data packets over an IP network. UDP/IP is used primarily for transmitting data over a network such as the second device 22 (i.e., the internet).

In an UDP/IP network environment, broadcast data packets are bounded to the subnetwork in which they originated. However, point-to-point data packets are not bounded to their subnetwork, but are bounded by the intranet/Internet/firewall for which their destination IP address resides. In other words, if you can successfully locate, or ping, a destination IP address, then the data packet will reach its destination. Distributed Interactive Simulation (DIS) is a protocol for simulation systems on different platforms. DIS enables these platforms to communicate in a common synthetic, or virtual, environment. DIS operates "on top of" the UDP/IP.

DIS requires each platform to be a node in the same subnetwork. By all platforms existing on the same subnetwork, the DIS protocol may transmit data packets, or Protocol Data Units (PDUs), as broadcast signals thereby enabling all PDU's to reach all other platforms, or nodes. The nodes may be part of a local Ethernet subnetwork or a long distance network using dedicated telephone lines (such as via Breeze Box or T1 links) all connected to the same subnetwork.

If multiple subnetworks were connected by direct, or point-to-point, gateway connections in accordance with the present invention, then DIS would not suffice to transmit, or broadcast, data packets via gateways. However, a gateway broadcast conversion process would allow the PDUs to be sent as point-to-point data packets to other subnetworks.

A network simulation system in accordance with the present invention may include such a composite broadcast communication network. The network would include at least two subnetworks. Each subnetwork has one gateway node and one or more application nodes. The gateway nodes communicate to all other gateway nodes by transmitting point-to-point (p2p) PDU's to other gateway nodes at remote subnetworks via an undedicated communication environment such as the internet, as described above.

The gateway nodes implement a gateway topology in that every gateway node transmits and receives from all other gateway nodes. The distributed application nodes communicate to other local application nodes on their local subnetwork by broadcasting PDU's within each local subnetwork. PDU's are broadcasted using the UDP/IP subnetwork protocol layer, described above. As defined by the UDP/IP, broadcasted data packets are bounded to their local subnetwork. The p2p PDU's, which are not bounded to their local subnetwork, may be transmitted to the remote subnetworks by using a direct IP address. To achieve the comprehensive composite transmission of PDU's on the composite network, the gateway nodes that receive locally broadcasted PDU's, in turn forward these received PDU's as p2p transmissions to all other remote gateway nodes that in turn re-broadcast these PDU's across their local subnetworks.

Each gateway node implements a two-step process in order to achieve the composite broadcast communication network in accordance with the present invention. FIGS. 1 & 2 illustrate the two steps of the composite broadcast network. One local subnetwork 101 and three remote subnetworks 102 are interconnected. A local gateway node 103 is part of the first local subnetwork 101. Three other remote gateway nodes 104 are part of second, third and fourth remote subnetworks 102. For this schematic illustration, there are two local application nodes 105 on the first subnetwork 101, two remote application nodes 106 on the second subnetwork 102, three remote application nodes 106 on the third subnetwork 102, and four remote application nodes 106 on the fourth subnetwork 102.

FIG. 1 illustrates the application node 105 transmitting a PDU to all other remote application nodes 106. FIG. 2 illustrates the application node 105 receiving a PDU from each remote application node 106 of the second, third, and fourth remote subnetworks 102. In practice, all nodes implement the same algorithm, but have different IP addresses as part of their routing program.

FIG. 1 shows the application node 105 transmitting a PDU as a broadcast signal 107 across the first subnetwork 101. The gateway node 103 listens for locally broadcasted PDU's, such as 107, on its local subnetwork 101. When the gateway node 103 receives the PDU 107, the gateway node converts and forwards the PDU as a p2p signal 108 to the remote gateway nodes 104 in the composite broadcasted network. The remote gateway nodes 104 receive the p2p PDU 108 from the gateway nodes 103, 104. In FIG. 1, all of the remote gateway nodes 104 receive the PDU 108 from the gateway node 103. Any combination of gateway nodes may receive the PDU 108, however, depending upon the address designations. The PDU 108 is then converted for rebroadcasted (illustrated by 109) by the remote gateway nodes 104 across the remote subnetworks 102. The remote application nodes 106 thereby receive the remotely broadcasted PDU's 107 from the application node 105.

FIG. 2 shows application nodes 106 on remote subnetworks 102, each broadcasting one PDU 111. Note that application nodes 106 may simultaneously be receiving locally broadcasted messages from their associated subnetworks 102. The remote gateway nodes 104 listen to the subnetwork broadcasts for locally broadcasted PDU's 111 from their local subnetworks 102. As the remote gateway nodes 104 receive the PDU's 111, the gateway nodes convert and forward the PDU's as p2p PDU's 112 to all other addressed gateway nodes 103, 104 (only PDU's to the local gateway node 103 shown). The local gateway node 103 listens for p2p PDU's 112 from all other gateway nodes 104. The local gateway node 103 receives the PDU's 112 from the remote gateway nodes 104. The p2p PDU's 112 are then converted for rebroadcasted by the local gateway node 103 across the local subnetwork 101 to the local application nodes 105. The composite result is that the local application nodes 105 have received the remotely broadcasted PDU's 111 from the remote application nodes 106 of the remote subnetworks 102. In this way, complete communication is achieved between all parts of all subnetworks 101, 102 in the system 10.

Figure 3A:
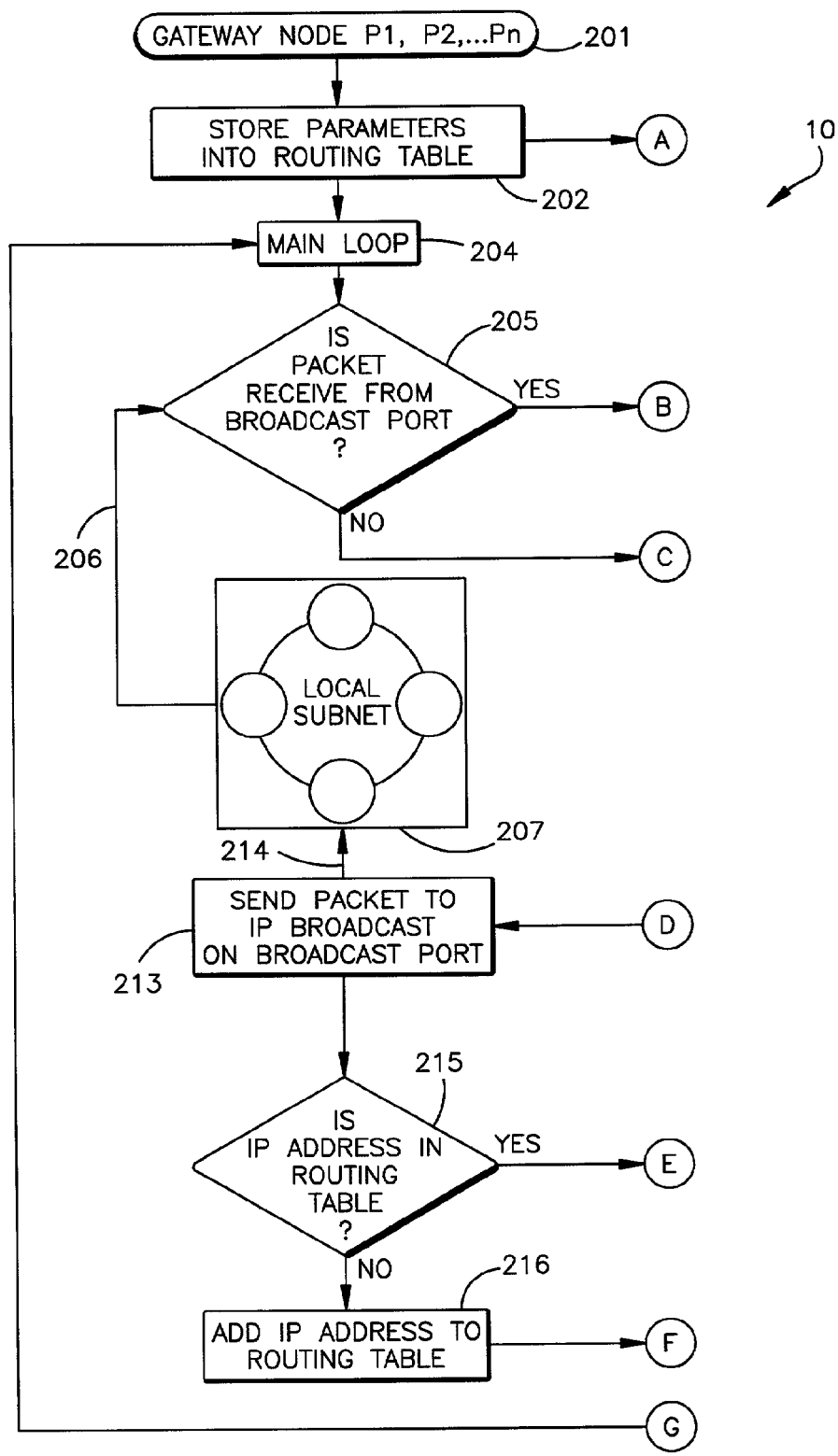
FIGS. 3A and 3B are a flow diagram illustrating the operation of the system of FIG. 1.
Figure 3B:
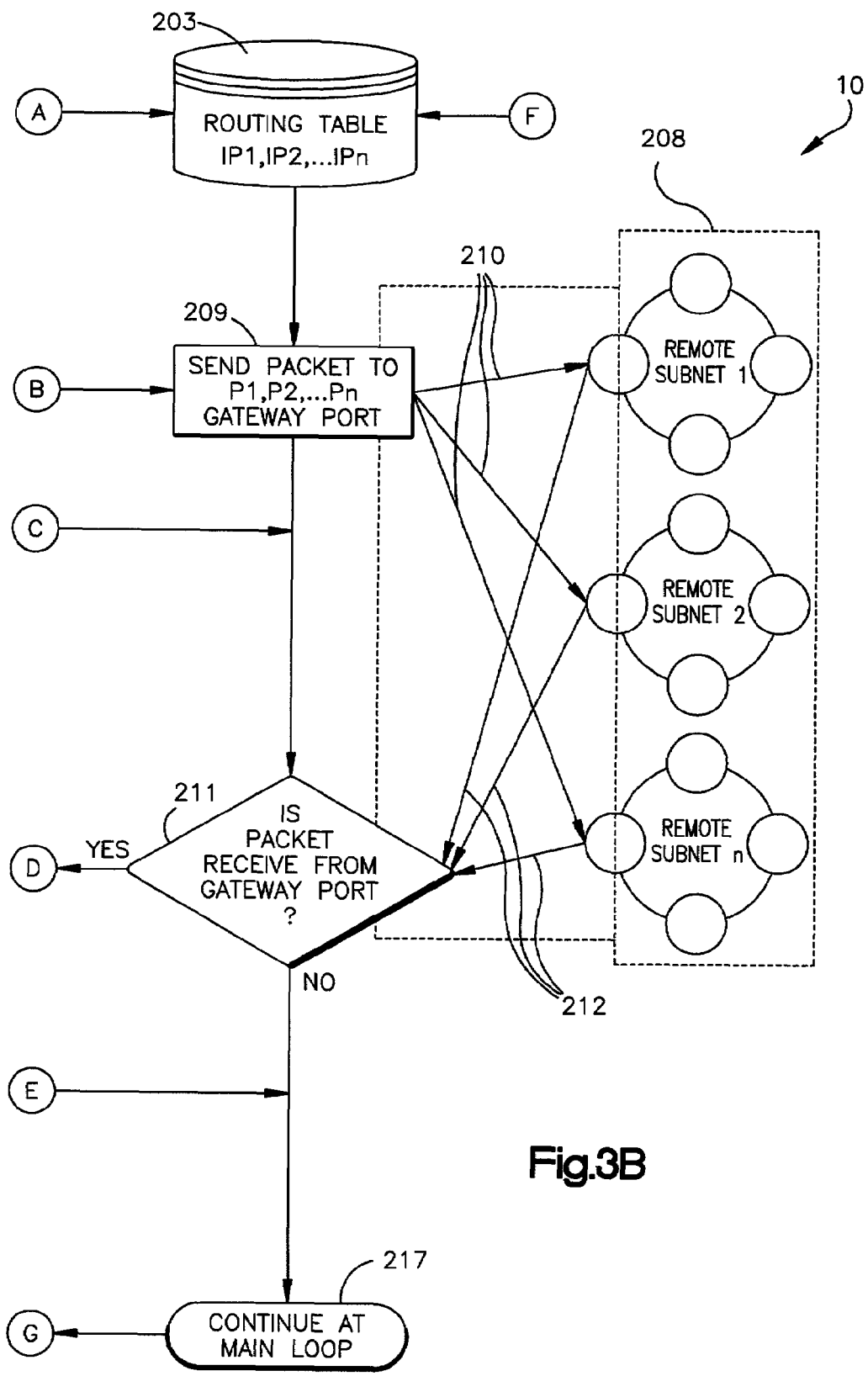

As viewed in FIGS. 3A and 3B, the gateway nodes 101, 102 are invoked with command line parameters. Internet Protocol (IP) addresses (IP1, IP2 . . . Ipn) 201 are stored (at 202) and accessed from a Routing Table 203 at each subnetwork. The IP addresses represent other gateway nodes on remote internet/LAN subnetworks. The IP address for the local gateway node 103 on the local subnetwork 101 is IP0. Other command line parameters may be a broadcast port number, a broadcast IP address, and a unicast port number, all of which are given default values read from an initial system configuration. Printing parameters may include IP addresses and names, DIS 2.0.4 PDU header data, and raw packet data in hexadecimal format.

Each two-step process utilizes the internal Routing Table 203 that contains the IP addresses of all the other nodes 103, 104, 105, 106 in the virtual network. The Routing Table 203 contains all the IP addresses for all the other nodes except for its own. A local broadcast IP address is also stored in the Routing Table 203. Typically, the other IP addresses are predetermined at startup.

After the Routing Table 203 is configured, a Main Loop 204 starts a system cycle by determining at 205 if a broadcast PDU 206 from a local application node 105 has been received and is waiting at a broadcast port 207. If a broadcast PDU 206 has been received, then the broadcast PDU is converted to a p2p PDU (at 209) and forwarded as p2p PDU 210 to all addressed remote gateway nodes 104. Broadcast PDU 206 is converted to a p2p PDU 209 PDU by simply replacing a broadcast IP address with a p2p IP address from the Routing Table 203. This conversion may be accomplished for every IP address in the Routing Table 203.

The cycle is now half complete. The main loop 204 then determines if one or more p2p PDU's 212 from remote gateway nodes 104 have been received and are waiting at a p2p port 211. If p2p PDU's 212 have been received, then the p2p PDU's 212 are converted to broadcast PDU's 213 (at 211) and forwarded as a broadcast PDU 214 to the local application nodes 105. If a p2p PDU has not been received, the cycle restarts at 217.

If the p2p PDU 212 is not in the Routing Table 203, then its IP address is dynamically added to the Routing Table. By dynamically adding the IP address, additional applications may automatically join the composite broadcast network with no interruptions or reconfigurations.

As illustrated schematically in FIGS. 3A and 3B, a computer program product in accordance with the present invention may perform the above described network simulation. At step 201, the gateway nodes are defined. Following step 201, step 202 stores the addresses for each of the gateway nodes in a routing table. Following step 202, step 204 accesses a main loop for network simulation. Following step 204, step 205 determines whether a data packet has been received from a subnetwork broadcast port. If the determination of step 205 is YES, then step 209 sends the data packet to a gateway port. Following step 209, step 210 sends the data packet across an undedicated network to other subnetworks as point-to-point signals.

Step 211 determines whether another data packet has been received from a gateway port for the other subnetworks. If the determination of step 211 is YES, then step 213 sends the other data packet to a broadcast port. Following step 213, step 214 sends the other data packet across the subnetwork as a broadcast signal.

Also, if the determination of step 211 is YES, then step 215 determines whether the IP address of the data packet is already stored in the routing table. If the determination to step 215 is NO, then step 216 adds the IP address to the routing table.

Figure 4:
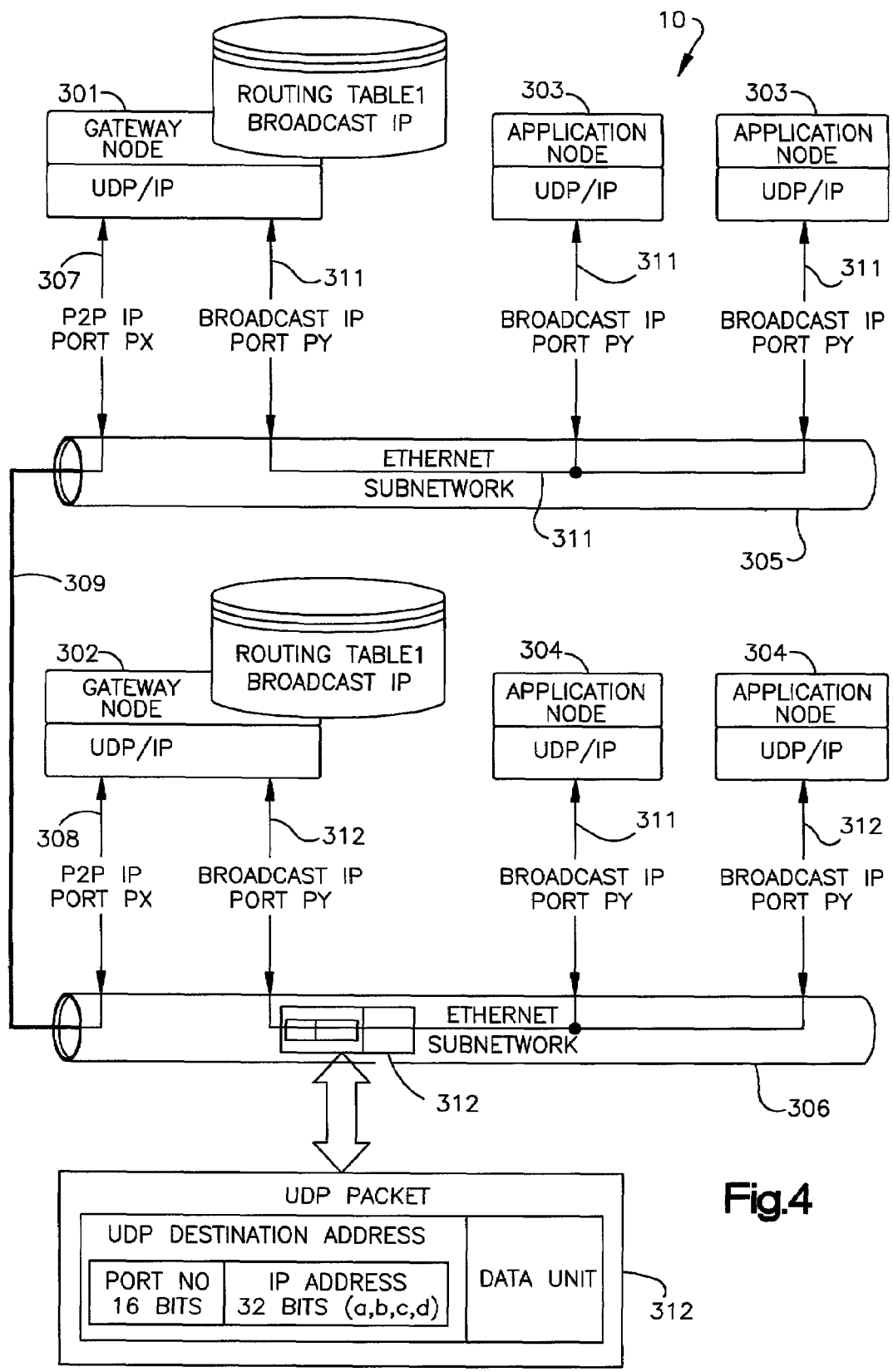
FIG. 4 is a detailed flow diagram illustrating the operation of a system in accordance with another aspect of the present invention.

In accordance with another aspect of the present invention, as viewed in FIG. 4, UDP/IP addresses 307, 308, 311, 312 are used to achieve the total composite broadcast communication between application nodes 303, 304 (similar to nodes 105, 106 in FIGS. 1 & 2). The gateway nodes 301, 302 (similar to nodes 103, 104 in FIGS. 1 & 2) use dedicated port numbers to send and receive broadcast PDU's 311, 312 and p2p PDU's 307, 308, 309. Each gateway node 301, 302 and application node 303, 304 is bounded to its respective port to lockout the subsequent allocation of those ports to another node. Typically, each broadcast PDU 311, 312 is an Ethernet Protocol Data Unit (EPDU) having a 16 bit port number and a 48 bit IP address that is used by the UDP/IP Protocol for the correct routing of PDU's. The p2p data streams 307, 308, 309 link the subnetworks 305, 306 as one network.

Figure 5:
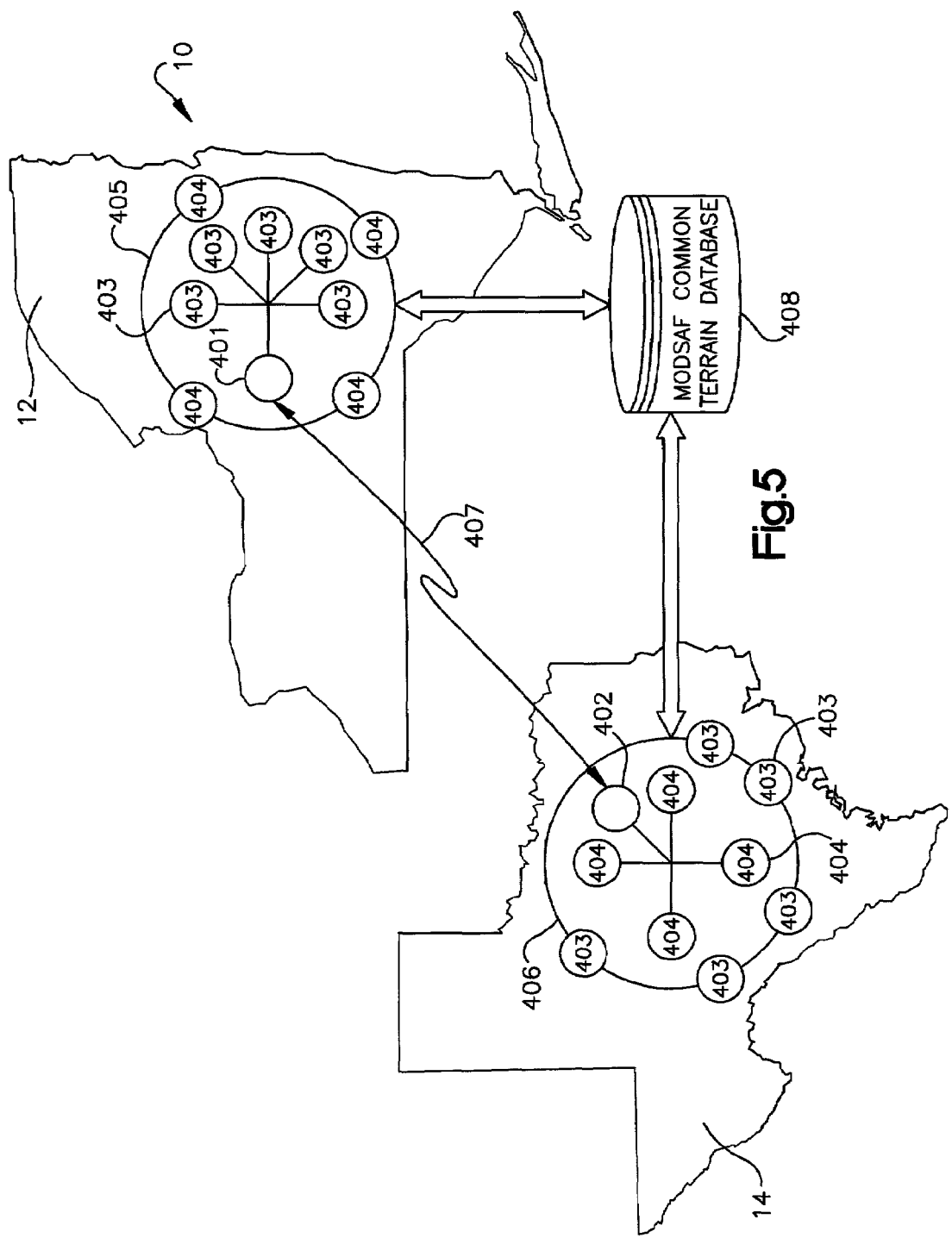
FIG. 5 is a schematic view of a simulation conducted by the system of FIG. 1.

As viewed in FIG. 5, a synthetic military environment software packet (ModSAF—Modular Semi-Automated Forces) 408 may be used as a common database platform. An undedicated intranet 407, instead of the Internet, may link two LAN Ethernet subnetworks 405, 406, one each at a site. Six simulated entities, such as four Surface to Air Missiles (SAM's) and two Trucks (T's) may simulate targets at one site 12 (i.e., New York). Two real-time man-in-the-loop observer simulators, a helicopter, and a jet airplane may also be simulated at the site 12. Four real-time simulated entities, such as Unmanned Air Vehicles (UAVs), may be simulated at another site 14 (i.e., Texas). The UAV simulators at site 14 may have embedded software algorithms that autonomously search and destroy SAM's (at site 12). The combination of real-time man-in-the-loop observer simulators and SAM simulated sites engaging in a real-time test from remote sites 12, 14 via a composite broadcast network 10 may be conducted in this way. This system 10 provides the advantage of sharing remote hardware across a multitude of facilities/locations within a network system.

In accordance with another feature of the present invention, a method allows communication within a network (FIGS. 1 & 2). The method includes the steps of: transmitting a data packet as a broadcast signal 107 from a first application node 105 of a first subnetwork 101 to a second application node 105 of the first subnetwork and to a first gateway node 103 of the first subnetwork; transmitting the data packet as a point-to-point signal 108 from the first gateway node 103 to a second gateway node 104 of a second subnetwork 102; and transmitting the data packet a broadcast signal 109 from the second gateway node 104 of the second subnetwork 102 to at least one application node 106 of the second subnetwork.

The method may further includes the steps of: transmitting another data packet as a broadcast signal 111 from the at least one application node 106 of the second subnetwork 102 to the second gateway node 104 of the second subnetwork; transmitting the other data packet as a point-to-point signal 112 from the second gateway node 104 to the first gateway node 103 of the first subnetwork 101; and transmitting the data packet as a broadcast signal 113 from the first gateway node 103 of the first subnetwork to the first application node 105 of the first subnetwork 101.

In accordance with still another feature of the present invention, an apparatus 400 may simulate a war game (FIG. 5)

with game participants and equipment at remote locations 12, 14 from each other. The apparatus 400 includes a first means 401, 403, a second means 407, and a third means 402, 404. The first means 401, 403 transmits a data packet as a broadcast signal from a first application node 403 of a first subnetwork 405 to a second application node 403 of the first subnetwork and to a first gateway node 401 of the first subnetwork. The second means 407 transmits the data packet as a point-to-point signal from the first gateway node 401 to a second gateway node 402 of a second subnetwork 406. The third means 402, 404 transmits the data packet as a broadcast signal from the second gateway node 402 of the second subnetwork 406 to at least one application node 404 of the second subnetwork.

The third means 402, 404 may transmit another data packet as a broadcast signal from the at least one application node 404 of the second subnetwork 406 to the second gateway node of the second subnetwork. The second means 407 may transmit the other data packet as a point-to-point signal from the second gateway node 402 to the first gateway node 401 of the first subnetwork 405. The third means 402, 404 may transmit the other data packet as a broadcast signal from the first gateway node 401 of the first subnetwork 405 to the first application node 403 of the first subnetwork 405.

The first means 401, 403 may comprise a subnetwork consisting of linked computers. The second means 407 may comprise portions of the Internet or another undedicated system. The third means 402, 404 may comprise a local subnetwork consisting of linked computers.

Although the invention has been described in conjunction with the preferred embodiments, it is to be appreciated that various modifications may be made without departing from the spirit and scope of the invention as defined by the appended claims.

Having described the invention, we claim:

1. A computer readable medium containing computer executable instructions, which when executed by a computer, cause the computer to perform instructions for communication within a network, said method comprising the steps of:
  a first computer executable instruction for transmitting a data packet as a broadcast signal from a first application node of a first subnetwork to a first gateway node of the first subnetwork;
  a second computer executable instruction for transmitting the data packet as a point-to-point signal from the first gateway node to a second gateway node of a second subnetwork;
  a third computer executable instruction for transmitting the data packet as a broadcast signal from the second gateway node of the second subnetwork to at least one application node of the second subnetwork;
  utilizing said three transmitting steps to simulate a war game between two remote geographic sites such that the data packet is stored in memory of one of the first subnetwork and the second subnetwork; and
  transmitting the data packet as a broadcast signal to a second application node of the first subnetwork.

2. The computer readable medium as set forth in claim 1 wherein said second computer executable instruction comprises transmitting the data packet as a point-to-point signal across an undedicated communication network.

3. The computer readable medium as set forth in claim 2 wherein the undedicated communication network is the Internet.

4. The computer readable medium as set forth in claim 1 wherein the broadcast signals each comprise an Ethernet Protocol Data Unit.

5. The computer readable medium as set forth in claim 1 wherein the point-to-point signal includes an IP address.

6. A system comprising:
  a first device for transmitting a data packet as a broadcast signal from a first application node of a first subnetwork to a first gateway node of the first subnetwork;
  a second device for transmitting the data packet as a point-to-point signal from the first gateway node to a second gateway node of a second subnetwork; and
  a third device for transmitting the data packet as a broadcast signal from the second gateway node of the second subnetwork to at least one application node of the second sub network,
  said first, second, and third devices simulating a war game between two remote geographic sites such that the data packet is stored in memory of one of the first subnetwork and the second subnetwork,
  said third device transmitting another data packet as a broadcast signal from the at least one application node of the second subnetwork to the second gateway node of the second subnetwork, said second device transmitting the other data packet as a point-to-point signal from the second gateway node to the first gateway node of the first subnetwork, said third device transmitting the other data packet as a broadcast signal from the first gateway node of the first subnetwork to the first application node of the first subnetwork.

7. The system as set forth in claim 6 wherein said first device is a computer.

8. The system as set forth in claim 7 wherein the first gateway node converts the data packet from the broadcast signal to the point-to-point signal by adding an IP address to the broadcast signal.

9. The system as set forth in claim 6 wherein said third device is a computer.

10. The system as set forth in claim 6 wherein said second device is an undedicated intranet.

11. An apparatus for simulating a war game, said apparatus comprising:
  a first means for transmitting a data packet as a broadcast signal from a first application node of a first subnetwork to a first gateway node of the first subnetwork;
  a second means for transmitting the data packet as a point-to-point signal from the first gateway node to a second gateway node of a second subnetwork; and
  a third means for transmitting the data packet as a broadcast signal from the second gateway node of the second subnetwork to at least one application node of the second subnetwork,
  said first, second, and third transmitting means simulating the war game between two remote geographic sites such that the data packet is stored in memory of said second transmitting means,
  said third means transmitting another data packet as a broadcast signal from the at least one application node of the second subnetwork to the second gateway node of the second subnetwork, said second means transmitting the other data packet as a point-to-point signal from the second gateway node to the first gateway node of the first subnetwork, said third means transmitting the other data packet as a broadcast signal from the first gateway node of the first subnetwork to the first application node of the first subnetwork.

12. A communications system comprising:

a first subnetwork having a first application node, comprising at least one computer, and a first gateway node, comprising one of a communication hub and a computer; and a second subnetwork having a second application node, comprising at least one computer, and a second gateway node, comprising one of a communication hub and a computer, said first application node transmitting a data packet as a broadcast signal to said first gateway node of said first subnetwork;

said first gateway node transmitting said data packet as a point-to-point signal from said first gateway node to said second gateway node of said second subnetwork, said second gateway node transmitting said data packet as a broadcast signal from said second gateway node of said second subnetwork to said second application node of said second subnetwork, the broadcast signals being stored in memory of one of said first gateway node and said second gateway node, said first and second subnetworks simulating a war game between two remote geographic sites, said second application node transmitting another data packet as a broadcast signal to said second gateway node, said second gateway node transmitting said other data packet as a point-to-point signal to said first gateway node, and said first gateway node transmitting said other data packet as a broadcast signal to said first and second application nodes.

* * * * *